(12) United States Patent
Hagihara et al.

(10) Patent No.: US 6,407,156 B1
(45) Date of Patent: Jun. 18, 2002

(54) PHOTOCATALYTIC TITANIUM DIOXIDE POWDER, PROCESS FOR PRODUCING SAME, AND APPLICATIONS THEREOF

(75) Inventors: Hiroyuki Hagihara, Tokyo; Katsura Ito, Shiojiri, both of (JP)

(73) Assignee: Showa Denko Kabusiki Kaisha, Tokyo (JP)

( * ) Notice: Subject to any disclaimer, the term of this patent is extended or adjusted under 35 U.S.C. 154(b) by 13 days.

(21) Appl. No.: 09/657,642

(22) Filed: Sep. 7, 2000

Related U.S. Application Data

(60) Provisional application No. 60/162,124, filed on Oct. 29, 1999.

(30) Foreign Application Priority Data

Sep. 8, 1999 (JP) .......................................... 11-254086

(51) Int. Cl.$^7$ ................................................ C08K 3/40
(52) U.S. Cl. ..................................................... 524/494
(58) Field of Search ........................................ 524/494

(56) References Cited

U.S. PATENT DOCUMENTS

| | | | | |
|---|---|---|---|---|
| 4,375,989 A | * | 3/1983 | Makinen ..................... | 106/300 |
| 4,377,417 A | * | 3/1983 | Brand ......................... | 106/300 |
| 5,270,076 A | * | 12/1993 | Evers .......................... | 427/270 |
| 5,910,213 A | * | 6/1999 | Ashdown .................... | 106/436 |
| 6,090,736 A | | 7/2000 | Taoda et al. | |

FOREIGN PATENT DOCUMENTS

| | | |
|---|---|---|
| JP | 10-244166 A | 9/1998 |
| JP | 10-310401 A | 11/1998 |

OTHER PUBLICATIONS

International Search Report.
Patent Abstracts of Japan, abstracting JP–10–310401 of Nov. 24, 1998.
Patent Abstracts of Japan, abstracting JP–10–244166 of Sep. 14, 1998.

* cited by examiner

*Primary Examiner*—Paul R. Michl
(74) *Attorney, Agent, or Firm*—Sughrue Mion, PLLC

(57) ABSTRACT

A photocatalytic powder comprising finely divided titanium dioxide particles having a coating of a substantially water-insoluble organic substance on the surface of each titanium dioxide particle. The photocatalytic powder is made by adding an insolubilizer to a slurry containing finely divided titanium dioxide particles and a water-soluble organic substance to form a coating of an substantially water-insoluble organic substance on the surface of each titanium dioxide particle. The photocatalytic powder is used in the form of a mixture with an organic polymer for making a shaped article having good environmental clarifying property, or is supported on the surface of a structure to provide a structure having good environmental clarifying property.

12 Claims, No Drawings

PHOTOCATALYTIC TITANIUM DIOXIDE POWDER, PROCESS FOR PRODUCING SAME, AND APPLICATIONS THEREOF

CROSS-REFERENCE TO RELATED APPLICATION

This application is an application filed under 35 U.S.C. § 111(a) claiming benefit pursuant to 35 U.S.C. § 119(e)(1) of the filing date of Provisional Application 60/162,124 filed Oct. 29, 1999, pursuant to U.S.C. § 111(b).

BACKGROUND OF THE INVENTION (1) Field of the Invention

This invention relates to a photocatalytic titanium dioxide powder, process for producing the same and applications thereof. More particularly, it relates to a photocatalytic powder comprising finely divided titanium dioxide particles having a coating of a substantially water-insoluble substance; a process for producing the photocatalytic powder; an organic polymer composition comprising the photocatalytic powder; a shaped article made of the polymer composition; and a structure having the photocatalytic powder on the surface thereof.

The photocatalytic titanium dioxide powder of the present invention is used as an environmental clarification material for removing malodor, decomposition-removing harmful substances or pollutants in air, treating drainage, purifying waste water, or performing sterilization or algicidal treatment of water. In particular, the photocatalytic titanium dioxide powder of the present invention is suitably used as an environmental clarification material by coating it on the surface of textile fiber, paper or plastic article, or incorporating it into textile fiber or plastic article at the step of producing the same, or used in the form of a coating material.

(2) Description of the Related Art

In recent years, photocatalysts using finely divided titanium dioxide particles are attracting attention as an environmental clarification material used for the purpose of antibacterial effect, deodorization, anti-staining or air or water clarification. The photocatalytic mechanism of the titanium dioxide is considered as follows. An electron and a hole generated inside the finely divided titanium dioxide particles convert water and oxygen present in the vicinity of the surface of the titanium dioxide particles into hydroxyl radical or hydrogen peroxide, and by virtue of the strong oxidation-reduction function of hydroxyl radical or hydrogen peroxide, harmful substances are converted into a harmless substance such as carbon dioxide gas, thereby attaining clarification. This photocatalytic action of finely divided titanium dioxide particles is said to permanently lasts as long as finely divided titanium dioxide particles, light, water and oxygen are present.

As applications of the titanium dioxide photocatalyst attempts are being made wherein the photocatalyst is incorporated in a medium having a shape suitable for handling such as fiber and plastic molded article, or a the surface of a substrate such as cloth and paper is coated with the photocatalyst. However, the strong photocatalytic action of titanium dioxide causes decomposition or degradation not only of harmful organic materials or environmental pollutants but also of the medium itself such as textile fiber, plastic and paper. This stands as an obstacle to the practical use of titanium dioxide photocatalyst. A coating material obtained by mixing finely divided titanium dioxide particles and a binder is drawing attention because of its good handling properties. However, an inexpensive binder exhibiting no adverse effect on the above-described medium has not yet been found out.

A process of allowing a photocatalytically inactive compound to be supported in the form of islands on the surface of titanium dioxide particles thereby suppressing the photocatalytic activity thereof so as to prevent or minimizing degradation of a plastic medium or a binder attributable to the activity of titanium dioxide particles is proposed in Japanese Unexamined Patent Application No. H9-225319 and H9-239277 (the term "Japanese unexamined patent publication" is hereinafter abbreviated to "JP-A"). According to this process, the degradation of a plastic medium or a binder is reduced, but, the photocatalytically inactive compound directly adheres to the active site on the surface of titanium dioxide particles, therefore, it reduces the activity of the titanium dioxide particles as a photocatalyst, namely, it counteracts the photocatalytic activity thereof.

A photocatalyst comprising titanium dioxide particle, the surface of which is coated with porous calcium phosphate is proposed in JP-A H10-244166. This coated titanium dioxide particle has durability which is still poor under irradiation of a strong ultraviolet ray such as sunlight.

Further, in International Publication WO99/33566, there is disclosed a photocatalytic powder comprising finely divided titanium dioxide particles of which the surface is at least partially provided with a porous coating layer of calcium phosphate, with an anionic surfactant being present at the interface between the surface of titanium dioxide particle and the porous coating layer.

SUMMARY OF THE INVENTION

In view of the foregoing problems of the heretofore proposed techniques, an object of the present invention is to provide a photocatalytic titanium dioxide powder which can effectively and advantageously perform the environmental clarification, for example, which can remove malodor, decomposition-remove harmful substances or pollutants in air, treat drainage, purify waste water and impart bactericidal or antifungal properties, in particular, which deteriorates mediums such as textile fiber, paper or plastic shaped article only to a negligible extent and exhibits excellent durability for a long period of time when it is coated on textile fiber, paper or plastic shaped article, incorporated into fiber or plastic shaped article, or used in the form of a coating material.

Other objects of the present invention are to provide a process for producing the above-mentioned photocatalytic titanium dioxide powder, a polymer composition comprising an organic polymer and the photocatalytic titanium dioxide powder, a shaped article made of the polymer composition, and a structure having the photocatalytic powder on the surface thereof.

To sum up, the objects of the present invention are to provide a photocatalytic titanium dioxide powder capable of exhibiting durable photocatalytic activity in the environment irradiated with strong light such as sunlight, a polymer composition comprising the photocatalytic powder, a shaped article made of the polymer composition, and a structure having the photocatalytic powder on the surface thereof.

As a result of extensive researches, the present inventors have found that when a coating of a substantially water-insoluble organic substance is formed on the surface of finely divided titanium dioxide particle, the above-described objects can be achieved.

Thus, in one aspect of the present invention, there is provided a photocatalytic powder comprising finely divided titanium dioxide particles having a coating of a substantially water-insoluble organic substance formed on the surface of each titanium dioxide particle.

In another aspect of the present invention, there is provided a process for producing a photocatalytic powder, comprising the steps of (i) mixing a water-soluble organic substance and finely divided titanium dioxide particles in an aqueous medium to prepare a slurry; (ii) adding an insolubilizer such as, for example, a water-soluble calcium compound to the slurry to form a coating of an substantially water-insoluble organic substance on the surface of each titanium dioxide particle; and further, optionally, (iii) calcining the titanium dioxide particle having formed thereon the coating of a substantially water-insoluble organic substance at a temperature of about 100° C. to about 800° C.

In further aspects of the present invention, there are provided a polymer composition comprising an organic polymer and the above-mentioned photocatalytic powder comprising finely divided titanium dioxide particles having formed thereon a coating of an substantially water-insoluble organic substance; a shaped article made of the organic polymer composition; and a structure having the above-mentioned photocatalytic powder on the surface thereof.

DETAILED DESCRIPTION OF PREFERRED EMBODIMENTS

The photocatalytic powder of the present invention comprises finely divided titanium dioxide particles having a coating of a substantially water-soluble organic substance formed on the surface of each titanium dioxide particle. The coating of a substantially water-soluble organic substance is formed by adding an insolubilizer to a slurry containing a coating-forming water-soluble organic substance and finely divided titanium dioxide particles to insolubilize the water-soluble organic substance and deposit a substantially water-insoluble organic substance on the surface of the titanium dioxide particles.

By the term "substantially water-insoluble organic substance" as used herein we mean that this organic substance exhibits a small solubility produce in water. The solubility in water of this substance is preferably such that the solubility product (which is also called as solubility constant) in water as measured at a temperature of 25° C. is not larger than about $10^{-10}$, more preferably not larger than about $10^{-20}$, and most preferably not larger than about $10^{-25}$.

The water-insoluble organic substance is preferably at least one substance selected from a calcium salt of a polycarboxylic acid, a calcium salt of a polysulfonic acid, and a calcium salt of an anionic surfactant.

The physical structure of the coating of a substantially water-insoluble organic substance is not particularly limited as long as the coating is photocatalytically inactive and the photocatalytic activation of the surface of titanium dioxide particles is allowed. In addition, for the manifestation of the above-mentioned photocatalytic activation of the titanium dioxide particles, the coating of a substantially water-insoluble organic substance neither inhibits the diffusion and movement of compounds to be subjected to photocatalytic reaction, such as malodorous compounds, and decomposed components of the compound, such as a low-molecular-weight material, carbon dioxide gas, water and others, nor inhibits light transmission. Therefore, the coating of a substantially water-insoluble organic substance may be supported on parts of the surface of titanium dioxide, or on the entire surface thereof.

The amount of the coating of a substantially water-insoluble organic substance is generally formed in the range of about 0.01% to about 10% by weight, preferably about 0.1% to about 5% by weight, based on the weight of titanium dioxide. When the amount of the coating is smaller than about 0.01% by weight, titanium dioxide particles have such a great photocatalytic effect on plastic materials, paper, or fibers (that is, the mediums) that the durability of the mediums themselves is impaired. In contrast, when the amount of the coating is larger than about 10% by weight, the photocatalytic function of titanium dioxide particles is impaired.

The photocatalytic powder of the present invention is preferably such that the titanium dioxide particle having formed thereon the coating of a substantially water-insoluble organic substance have been prepared by calcining the titanium dioxide particle at a temperature of about 100° C. to about 800° C. after the surface of the titanium dioxide particle is coated with the substantially water-insoluble organic substance. The photocatalytic powder prepared by the high temperature calcination exhibits excellent compounding characteristics, shapability and uniform miscibility when the photocatalytic powder is incorporated into a polymer, and excellent retaining properties when the photocatalytic powder is supported on the surface of textiles, fibers or plastics.

There is no particular restriction on the preparation method of titanium dioxide particles which are used in the present invention as long as the titanium dioxide particles fundamentally exhibit photocatalytic activity. For instance, there can be employed titanium dioxide obtained by a vapor phase reaction using as a staring material a titanium halide, and titanium oxide obtained by hydrolyzing a titanic acid solution in a wet process. Alternatively, there may be employed titanium oxide obtained by calcining any of the above obtained titanium dioxides.

There is no restriction on the crystalline form of the finely divided titanium dioxide particles used in the present invention. The crystalline forms of anatase and brookite are preferable for obtaining high performance as the photocatalyst. The above-mentioned finely divided titanium dioxide particles may be either fine particles of any of the above-mentioned crystalline systems, or fine composite particles composed of the fine particles of the above-mentioned crystalline systems.

Preferably the titanium dioxide particles for use in the present invention have an average primary particle diameter of about 0.001 $\mu$m to about 0.2 $\mu$m, more preferably about 0.01 $\mu$m to about 0.1 $\mu$m. Particles of an average primary particle diameter of smaller than about 0.001 $\mu$m are difficult to efficiently produce. When the average primary particle diameter exceeds about 0.2 $\mu$m, the photocatalytic performance is drastically decreased.

The photocatalytic powder of the present invention can be used in the form of a composition comprising the photocatalytic powder and an organic polymer. As the organic polymer, there can be employed, for instance, thermoplastic polymers, thermosetting polymers, and natural resins. Since the organic polymer does not come in direct contact with the photocatalytic activated surface of the titanium dioxide owing to the formation of the aforementioned coating of a substantially water-insoluble organic substance, the organic polymer itself serving as the medium is scarcely susceptible to decomposition and deterioration.

As specific examples of the organic polymer, there can be mentioned polyolefins such as polyethylene, polypropylene and polystyrene, polyamides such as nylon 6, nylon 66 and aramid, polyesters such as polyethylene terephthalate and unsaturated polyesters, poly(vinyl chloride), poly (vinylidene chloride), poly(ethylene oxide), poly(ethylene glycol), silicone resin, poly(vinyl alcohol), vinyl acetal resin, polyacetate, ABS resin, epoxy resin, vinyl acetate resin, cellulose and cellulose derivatives including rayon, polyurethane resin, polycarbonate resin, urea resin, fluoroplastic, poly(vinylidene fluoride), phenolic resin, celluloid, chitin, starch, acrylic resin, unsaturated polyester, melamine resin, and alkyd resin.

The organic polymer compositions comprising the photocatalytic powder for environmental clarification of the present invention can be used in the form of a coating solution, a coating composition, a compound, or a masterbatch. The concentration of the photocatalytic powder in the organic polymer composition is in the range of about 0.01% to about 80% by weight, preferably about 1% to about 50% by weight, based on the entire weight of the composition. In addition, an absorbent such as activated carbon or zeolite may be incorporated in the organic polymer composition to enhance the effect of removing a malodorous substance.

A shaped article having environmental clarifying function can be made from the above-mentioned polymer composition. As examples of the shaped article, there can be mentioned fiber, film, and molded plastic articles.

Furthermore, the polymer composition of the present invention can be applied as a coating composition for various structures which include, for example, a wall material, glass, sign-board, and concrete for road construction because of the excellent durability of the organic polymer composition. Further, the coating-formed photocatalytic powder of the present invention and the organic polymer composition of the present invention, when they are coated on a structure (especially made of organic material) of paper, plastics, textile, wood or the like, or applied onto a coating of, for example, a car body, can sufficiently exhibit a photocatalytic function without causing photocatalytic deterioration and destruction of the medium (such as the structure or the coat).

The method for producing the photocatalytic powder according to the present invention will now be described. The photocatalytic powder is prepared by the steps of (i) mixing a water-soluble organic substance and finely divided titanium dioxide particles in an aqueous medium to prepare a slurry, and then (ii) adding an insolubilizer to the slurry to form a coating of an substantially water-insoluble organic substance on the surface of each titanium dioxide particle.

As the water-soluble organic substance, a polycarboxylic acid, a polysulfonic acid and an anionic surfactant, and alkali salts thereof and ammonium salts thereof are preferably used. The anionic surfactant preferably includes carboxylic acid type and sulfonic acid type. These water-soluble organic substances may be used either alone or in combination.

As specific examples of the polycarboxylic acid, there can be mentioned poly(acrylic acid), poly(methacrylic acid), poly(gultamic acid), poly(aspartic acid), and copolymers including the repeating units thereof. Specific examples of the above-mentioned copolymers are a maleic acid/methacrylic acid copolymer and a maleic acid/acrylic acid copolymer.

As specific examples of the polysulfonic acid, there can be mentioned poly(styrenesulfonic acid), poly(vinylsulfuric acid), poly(vinylsulfonic acid), poly-α-methylsulfonic acid and poly(ethylenesulfonic acid).

Examples of the anionic surfactant may include a high-molecular surfactant of a polycarboxylic acid type. Preferably, there can be employed carboxylate type surfactants such as fatty acid soda soap and alkyl ether carboxylic acid; sulfates such as sodium lauryl sulfate, sodium higher alcohol sulfate, sodium polyoxyethylene lauryl ether sulfate and sodium polyoxyethylene alkyl ether sulfate; and organic sulfonates such as sodium dodecylbenzenesulfonate, sodium alkylnaphthalenesulfonate, sodium salt of aromatic sulfonic acid, sodium alkanesulfonate and sodium salt of aromatic sulfonic acid-formaldehyde condensate. These anionic surfactant may be used either alone or in combination.

From the viewpoint of film properties for the photocatalyst, a high-molecular-weight compound is preferably employed as the water-soluble organic film-forming material for forming the coating of a substantially water-insoluble organic substance.

The titanium dioxide particles having the coating of a substantially water-insoluble organic substance exhibit excellent properties as the photocatalytic powder without causing any deterioration of the medium and any decrease in photocatalytic function, because the photocatalytic performance of the titanium dioxide is controlled. Especially when the water-soluble organic substance used is a high-molecular-weight compound, durability of the photocatalytic function is further enhanced.

The insolubilizer used preferably includes water-soluble calcium compounds which are capable of donating a calcium ion. Most preferably calcium chloride is used. The calcium compounds make water-soluble organic substance such as an organic carboxylic acid and organic sulfonic acid insoluble in the form of the calcium salts, thereby forming the above-mentioned coating of a substantially water-insoluble organic substances on the surface of titanium dioxide particle.

After completion of the formation of the coating of a substantially water-insoluble organic substance on the surface of titanium dioxide particles, those particles are separated, washed, and dried. To separate the coating-formed titanium dioxide particles from uncoated substantially water-insoluble inorganic substance, centrifugal separation, batch-wise sedimentation, and filtration are generally employed.

The coating-formed titanium dioxide particles are preferably calcined for further enhancing the photocatalytic function. That is, the coating-formed titanium dioxide particles are calcined in an inert gas or in air at a temperature of about 100° C. to about 800° C., preferably about 250° C. to 700° C., unreacted water-soluble starting materials can be evaporated and expelled, and the water absorption of the above-mentioned coated powder can also be controlled. The control of the water absorption leads to provision of excellent compound characteristics, shapability and uniform miscibility when the photocatalytic powder is incorporated into a polymer, and excellent retaining properties when the photocatalytic powder is supported on the surface of textiles, fibers or plastics.

In the photocatalytic powder, a metal such as platinum, rhodium, ruthenium, palladium, silver, copper, or zinc may be supported on the surface of the fine titanium dioxide particles. By supporting these metals the environmental clarifying action of the titanium dioxide particles is further enhanced, and the germicidal and algicidal action are also increased. These metal may be held on the titanium dioxide particles used as the starting material, or may be incorporated at the step of forming the above-mentioned coating of a substantially water-insoluble substance.

The present invention will now be specifically described with reference to the following example, It is to be understood that the present invention is not limited to the following examples.

Example 1

0.6 g of a commercially available high-molecular-weight surfactant of a sodium polycarboxylate type (trademark, "POISE 530", supplied by Kao Corporation) was added to 2.8 liters of pure water. To this mixture, 120 g of ultrafine particles of titanium dioxide ("F4", supplied by Showa Titanium K.K., with an average primary particle diameter of 0.03 μm) was added, and the mixture was subjected to dispersing treatment to prepare a titanium dioxide slurry.

Separately, 3.5 liters of a salt solution was prepared by adding $CaCl_2$ to pure water in such a manner that the concentration of $Ca^{2+}$ was 1.8 mM after the salt solution was mixed with the above-prepared titanium dioxide slurry. 2.8 liters of the titanium dioxide slurry and 3.5 liters of the salt solution were mixed together, and the mixture was allowed to stand at 40° C. for 24 hours to complete the surface treatment. Thereafter, the slurry was subjected to centrifugal separation with care, and dried at 120° C. for 4 hours to give 115 g of a titanium dioxide powder. The titanium dioxide powder was subjected to surface analysis, using FT-IR ("FT-IR1650", made by Perkin Elmer Inc.). As a result, it was observed from the absorption peak that a carboxyl group derived from the above-mentioned high-molecular-weight surfactant and a calcium salt was supported on the surface.

Evaluation of deodorizing function 3.5 g of the surface-treated titanium dioxide powder was place din a Petri dish with a diameter of 90 mm, and was then placed in a 5-liter Tedlar bag into which hydrogen sulfide was filled at an initial concentration of 60 ppm. The titanium dioxide powder was irradiated with ultraviolet light using black light, with the intensity of the ultraviolet light with a wavelength of 365 nm set at 0.23 $mW/cm^2$. After ultraviolet-light irradiation was performed for 30 minutes, the concentration of hydrogen sulfide in the Tedlar bag was measured using a detector tube ("4LL", made by GASTECH CORP.). The result was that the residual percentage of hydrogen sulfide was 30%. The deodorizing function of the titanium dioxide was thus confirmed.

Evaluation of resin deterioration

Using 1 kg of the above-mentioned surface-treated titanium dioxide powder and poly(ethylene terephthalate) resin, a compound with a titanium dioxide concentration of 20% was produced at 280° C. by means of a commercially available twin-screw kneading extruder ("KXW15-30MG", made by Technovel Corporation). The obtained compound was subjected to heat pressing so that a test piece with a size of 3 cmφ×1 cm was prepared. The yellowness (YI value, ASTM D 1925) of the test piece was measured using a spectrocolorimeter ("CM-2002", made by Minolta Co., Ltd.). The yellowness in terms of YI value was 8.6, namely, there was substantially no coloring. Then, the obtained test piece was irradiated with the light of 50 $mW/cm^2$ for 10 hours, using a fade meter (a xenon lamp made by Heraeus). The difference in yellowness (ΔYI) before and after the irradiation was examined to evaluate the deterioration of the resin. The numerical values are collectively shown in Table 1.

Example 2

A surface-coated photocatalytic powder was produced in the same manner as in Example 1 except that the sodium polycarboxylate used in Example 1 was replaced by sodium dodecylbenzenesulfonate (a special grade made by NACALAITESQUE, INC., abbreviated to "DBS-Na"). The obtained powder was subjected to the surface analysis. As a result, a sulfonic acid group and a calcium salt were observed by FT-IR. The obtained photocatalytic powder was then evaluated with respect to the deodorizing function and the resin deterioration in the same manner as in Example 1. the results are shown in Table 1.

Example 3

The surface-treated powder obtained in Example 1 was placed in an electric furnace, and calcined at 300° C. for 10 hours in the air atmosphere. The calcined product was evaluated with respect to the deodorizing function and the resin deterioration in the same manner as in Example 1. The results are shown in Table 1.

Example 4

The powder obtained in Example 1 was separately calcined in an electric furnace at 600° C. for 10 hours in an atmosphere of nitrogen. The photocatalytic performance thereof was evaluated in the same manner as mentioned above. The results are shown in Table 1.

Comparative Example 1

Ultrafine titanium dioxide particles ("F-4", supplied by Showa Titanium K.K., with an average primary particle diameter of 0.03 μm) without being subjected to the surface treatment were evaluated with respect to the deodorizing function and the resin deterioration in the same manner as in Example 1. The results are shown in Table 1.

Comparative Example 2

120 g of ultrafine titanium dioxide particles ("F-4", supplied by Showa Titanium K.K., with an average primary particle diameter of 0.03 μm) was added to 2.8 liters of pure water so that the ultrafine titanium dioxide particles were subjected to dispersing treatment to prepare a titanium dioxide slurry. 3.5 liters of a salt solution was prepared by adding NaCl, $NaHPO_4$, $KH_2PO_4$, KCl, $MgCl_2.6H_2O$, and $CaCl_2$ to pure water in such a manner that the concentration of $Na^+$ was 139 mM, the concentration of $K^+$ was 2.8 mM, the concentration of $Ca^{2+}$ was 1.8 mM, the concentration of $Mg^{2+}$ was 0.5 mM. the concentration of $Cl^-$ was 144 mM, and the concentration of $HPO_4^-$ was 1.1 mM after the solution was mixed with the titanium dioxide slurry. 2.8 liters of the titanium dioxide slurry and 3.5 liters of the salt solution were mixed together, and the mixture was allowed to stand at 40° C. for 24 hours. Thereafter, the slurry was washed and dried, whereby 100 g of a titanium dioxide powder coated with calcium phosphate was obtained. The obtained titanium dioxide powder was evaluated with respect to the deodorizing function and the resin deterioration in the same manner as in Example 1. The results are shown in Table 1.

Comparative Example 3

120 g of ultrafine titanium dioxide particles ("F-4", supplied by Showa Titanium K.K., with an average primary particle diameter of 0.03 μm), and 0.05 mol of sodium aluminate were poured into 1.8 liters of pure water so that the ultrafine titanium dioxide particles were subjected to dispersing treatment to prepare a titanium dioxide slurry. A 0.06 mol/liter of diluted sulfuric acid was added dropwise to the titanium dioxide slurry to adjust the pH value of the slurry to 7.2. The slurry was washed and dried, whereby an alumina-coated titanium dioxide powder was obtained. The obtained powder was evaluated with respect to the deodorizing function and the resin deterioration in the same manner as in Example 1. The results are shown in Table 1.

TABLE 1

| | Compound formed on particle surface | Calcination temp. (° C.) | Residual % of HS *1 | YI value at preparation of compound | YI value after UV irradiation *2 | ΔYI *3 |
|---|---|---|---|---|---|---|
| Ex. 1 | Ca polycarboxylate | — | 30 | 8.6 | 9.0 | 0.4 |
| Ex. 2 | Ca DBS | — | 35 | 9.5 | 10.5 | 1.0 |
| Ex. 3 | Ca polycarboxylate | 300 | 20 | 8.5 | 9.0 | 0.5 |
| Ex. 4 | Ca polycarboxylate | 600 | 25 | 8.4 | 8.9 | 0.5 |
| Co. Ex. 1 | — | — | 20 | 25 | 34.0 | 9.0 |
| Co. Ex. 2 | Ca phosphate | — | 60 | 8.0 | 8.4 | 0.4 |
| Co. Ex. 3 | Alumina | — | 98 | 8.2 | 8.3 | 0.1 |

*1 Deodorizing function - Residual percentage of hydrogen sulfide
*2 YI value as measured after irradiation with ultraviolet ray for 10 hours
*3 Difference of YI values as measured before and after irradiation with ultraviolet ray The surface-coated titanium dioxide photocatalytic powder according to the present invention exhibits photocatalytic action by irradiation with light, and therefore can be widely used for clarifying the environment, for example, removing malodors, decomposing and removing harmful substances or pollutants in the air, treating waste water and purifying water, and providing antibacterial properties and antifungal properties. The photocatalytic powder can perform such environmental clarification effectively. In particular, when the powder is coated on fibers, paper, and plastic articles, incorporated into fibers and plastic articles at the step of production, or prepared in the form of a coating compound, the powder can be utilized without causing the deterioration of the medium even under the circumstances of light exposure.

The photocatalytic powder of the present invention can provide a resin medium, a binder and the like with resistance to deterioration, without lowering the intrinsic environmental clarifying properties of titanium dioxide.

The photocatalytic powder, the organic polymer composition comprising the photocatalytic powder, the shaped article made of the polymer composition, and structure having the photocatalytic powder on the surface thereof according to the present invention exhibit particularly excellent environmental clarifying properties and durability under the circumstances of irradiation with weak light rather than strong light.

What is claimed is:

1. A photocatalytic powder comprising finely divided titanium dioxide particles having a coating of a substantially water-insoluble organic substance formed on the surface of each titanium dioxide particle, wherein said substantially water-insoluble organic substance is at least one substance selected from the group consisting of a calcium salt of a polycarboxylic acid, a calcium salt of a polysulfonic acid, and a calcium salt of an anionic surfactant.

2. The photocatalytic powder as claimed in claim 1, wherein the amount of the substantially water-insoluble organic substance is in the range of about 0.01% to about 10% by weight based on the weight of the titanium dioxide particle.

3. The photocatalytic powder as claimed in claim 1, wherein the titanium dioxide particle having formed thereon the coating of a substantially water-insoluble organic substance have been prepared by calcining the titanium dioxide particle at a temperature of about 100° C. to about 800° C. after the surface of the titanium dioxide particle is coated with the substantially water-insoluble organic substance.

4. A process for producing a photocatalytic powder, comprising the steps of:

mixing a water-soluble organic substance and finely divided titanium dioxide particles in an aqueous medium to prepare a slurry, and then adding an insolubilizer to the slurry to form a coating of a substantially water-insoluble organic substance on the surface of each titanium dioxide particle.

5. The process for producing a photocatalytic powder as claimed in claim 4, wherein said water-soluble organic substance is at least one substance selected from the group consisting of a polycarboxylic acid, a polysulfonic acid and an anionic surfactant, and alkali salts thereof and ammonium salts thereof.

6. The process for producing a photocatalytic powder as claimed in claim 4, wherein said insolubilizer is a water-soluble calcium compound.

7. The process for producing a photocatalytic powder as claimed in claim 4, wherein the titanium dioxide particle having formed thereon the coating of a substantially water-insoluble organic substance is further calcined at a temperature of about 100° C. to about 800° C.

8. An organic polymer composition comprising an organic polymer and a photocatalytic powder; said photocatalytic powder comprising finely divided titanium dioxide particles in which the surface of each titanium dioxide particle is coated with a substantially water-insoluble organic substance, and wherein said substantially water-insoluble organic substance is at least one substance selected from the group consisting of a calcium salt of a polycarboxylic acid, a calcium salt of a polysulfonic acid, and a calcium salt of an anionic surfactant.

9. The organic polymer composition as claimed in claim 8, wherein the amount of the substantially water-insoluble organic substance is in the range of about 0.01% to about 10% by weight based on the weight of the titanium dioxide particle.

10. The organic polymer composition as claimed in claim 8, wherein the titanium dioxide particle having formed thereon the coating of a substantially water-insoluble organic substance have been prepared by calcining the titanium dioxide particle at a temperature of about 100° C. to about 800° C. after the surface of the titanium dioxide particle is coated with the substantially water-insoluble organic substance.

11. A shaped article having photocatalytic function made of an organic polymer composition as claimed in claim 8.

12. A structure having photocatalytic function which has on the surface thereof a photocatalytic powder as claimed in claim 1.

* * * * *